US 8,794,633 B2

(12) United States Patent
Williams

(10) Patent No.: US 8,794,633 B2
(45) Date of Patent: Aug. 5, 2014

(54) LEAF SEAL

(71) Applicant: Rolls-Royce PLC, London (GB)

(72) Inventor: David Stephen Williams, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/692,609

(22) Filed: Dec. 3, 2012

(65) Prior Publication Data
US 2013/0154199 A1    Jun. 20, 2013

(30) Foreign Application Priority Data
Dec. 14, 2011   (GB) .................................. 1121440.0

(51) Int. Cl.
*F16J 15/32*        (2006.01)
*F02C 7/28*         (2006.01)
(52) U.S. Cl.
CPC ............... *F02C 7/28* (2013.01); *F16J 15/3292* (2013.01)
USPC ........................................................ 277/355
(58) Field of Classification Search
USPC ................................................. 277/355, 549
See application file for complete search history.

(56) References Cited

U.S. PATENT DOCUMENTS

| | | | |
|---|---|---|---|
| 2002/0105146 A1* | 8/2002 | Uehara et al. ............... | 277/355 |
| 2006/0033285 A1* | 2/2006 | Nishimoto et al. .......... | 277/355 |
| 2006/0208427 A1* | 9/2006 | Wright et al. ............... | 277/413 |
| 2007/0085277 A1* | 4/2007 | Rhodes et al. .............. | 277/355 |
| 2009/0309311 A1* | 12/2009 | Verma et al. ................ | 277/411 |

FOREIGN PATENT DOCUMENTS

| | | |
|---|---|---|
| EP | 0 391 676 | 10/1990 |
| EP | 1 231 416 A2 | 8/2002 |
| EP | 1 302 708 A2 | 4/2003 |
| EP | 2 138 747 A1 | 12/2009 |
| EP | 2 336 609 A1 | 6/2011 |
| GB | 2475404 A | 5/2011 |
| WO | WO 2006/016098 A1 | 2/2006 |

OTHER PUBLICATIONS

Apr. 4, 2012 British Search Report issued in British Application No. GB1121440.0.
Mar. 1, 2013 European Search Report issued in European Application No. 12 19 5218.

* cited by examiner

*Primary Examiner* — Vishal Patel
*Assistant Examiner* — Christine M Mills
(74) *Attorney, Agent, or Firm* — Oliff PLC

(57) ABSTRACT

A leaf seal assembly provides a fluidic seal between a first and second member and includes first and second cover plates defining a channel, with a first and second edge, respectively. A plurality of leaf elements are located within the channel, each element having first and second edges adjacent to the first and second cover plates, respectively and a projecting portion of each element extends beyond both edges. A fluid flow in a first direction causes the leaf elements to move away from the first member to create a fluid passage between the elements and the member, allowing a flow through the seal in the first direction; and a fluid flow in a second direction causes the leaf elements to move towards the first member such that a third edge of the projecting portion of each element contacts the member, opposing the flow through the seal in the second direction.

11 Claims, 6 Drawing Sheets

LEAF SEAL

Figure 1:
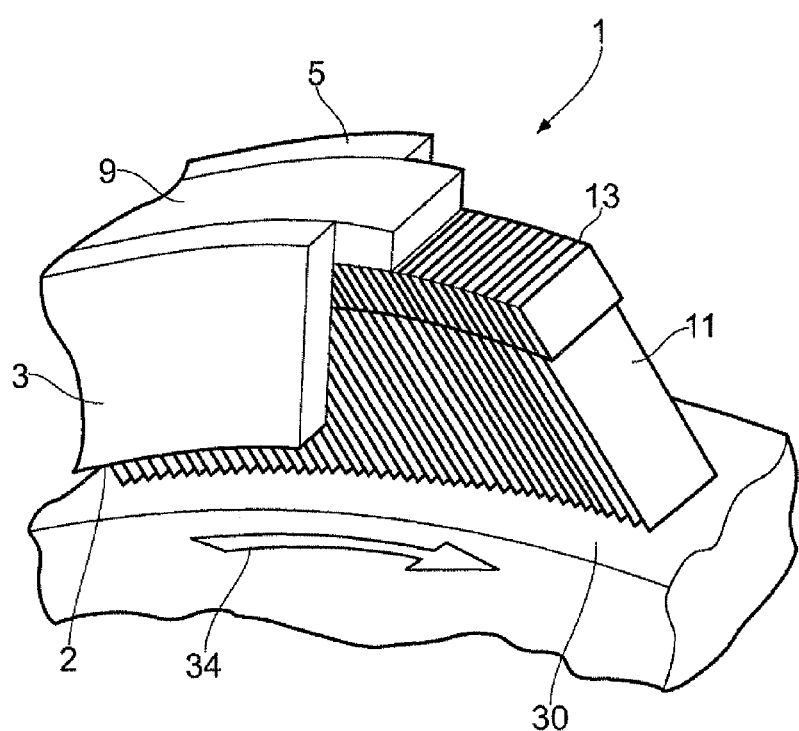

The present invention relates generally to a seal arrangement and in particular to improvements to leaf seals.

It is frequently necessary to effect a seal in a clearance gap between two components that are capable of relative movement. In particular, seals are often required to seal between a rotatable shaft and a housing surrounding the shaft, the housing having a bore through which the shaft extends.

Within a gas turbine engine there are shafts that rotate at relatively high speeds and are exposed to pressurised hot gases. Seals are required for these shafts and the seal performance can have a significant effect on the overall efficiency of the gas turbine engine. There are a number of seal designs that have been proposed for such purposes and that are designed to operate within the harsh environment found within a gas turbine engine.

One type of seal that has been developed for shafts that rotate at relatively high speeds, as found in gas turbine engines, is a brush seal. In such a brush seal, a plurality of fine bristles (such as bronze or stainless steel wire) are held in a carrier mounted on a housing. The tips of the bristles wipe against the shaft so as to effect a seal.

A problem with such brush seals is that in use the bristles tend to flex in an axial, sealing direction, away from the high pressure side of the seal and towards the low pressure side. Bending of the bristles in this way reduces the effective radial length of the bristles and so reduces the contact between the bristle tips and the shaft, thereby reducing the sealing efficiency. Additionally, flexing of the bristles can clamp the bristles against each other and against a backing member of the seal. Friction between the bristles and the backing member stiffens the bristles and prevents free movement of the bristles so that they no longer follow the shaft. Excursions of the rotating shaft are therefore not accommodated by the bristles. This leads to clearance gaps opening up between the bristle tips and shaft, and at the other extreme increased wear of the bristles, both of which reduce the seal performance.

An alternative type of seal that has been proposed for gas turbine engines, and also other applications, is a leaf seal. Leaf seals, which are sometimes called foil seals, comprise a number of thin resilient yet flexible strips which are densely packed together with the strips substantially aligned in the sealing direction. One end of the strips is held within a housing whilst the other, radially inner end of the strip extends across the seal gap and rests on the shaft. Such a seal design is described in European Patent Application EP 0,391,676. As described, the seal elements, comprising the resilient strips are axially stiff and do not tend to bend in the axial, sealing direction. This type of seal therefore alleviates some of the problems described above in relation to brush seals.

However, the tips of the leaf elements can become damaged and worn by being in constant contact with a rotating shaft. Further, a leaf seal is usually designed for a pressure gradient in one direction only. Therefore, if the direction of the pressure gradient reverses then the seal may fail and fluid may leak.

It is therefore desirable to have an improved leaf seal which prevents wear of the leaf element tips.

It is also desirable to have an improved leaf seal which can seal effectively regardless of the pressure gradient.

According to an aspect of the present invention there is provided a leaf seal assembly as set out in the claims.

Figure 2:
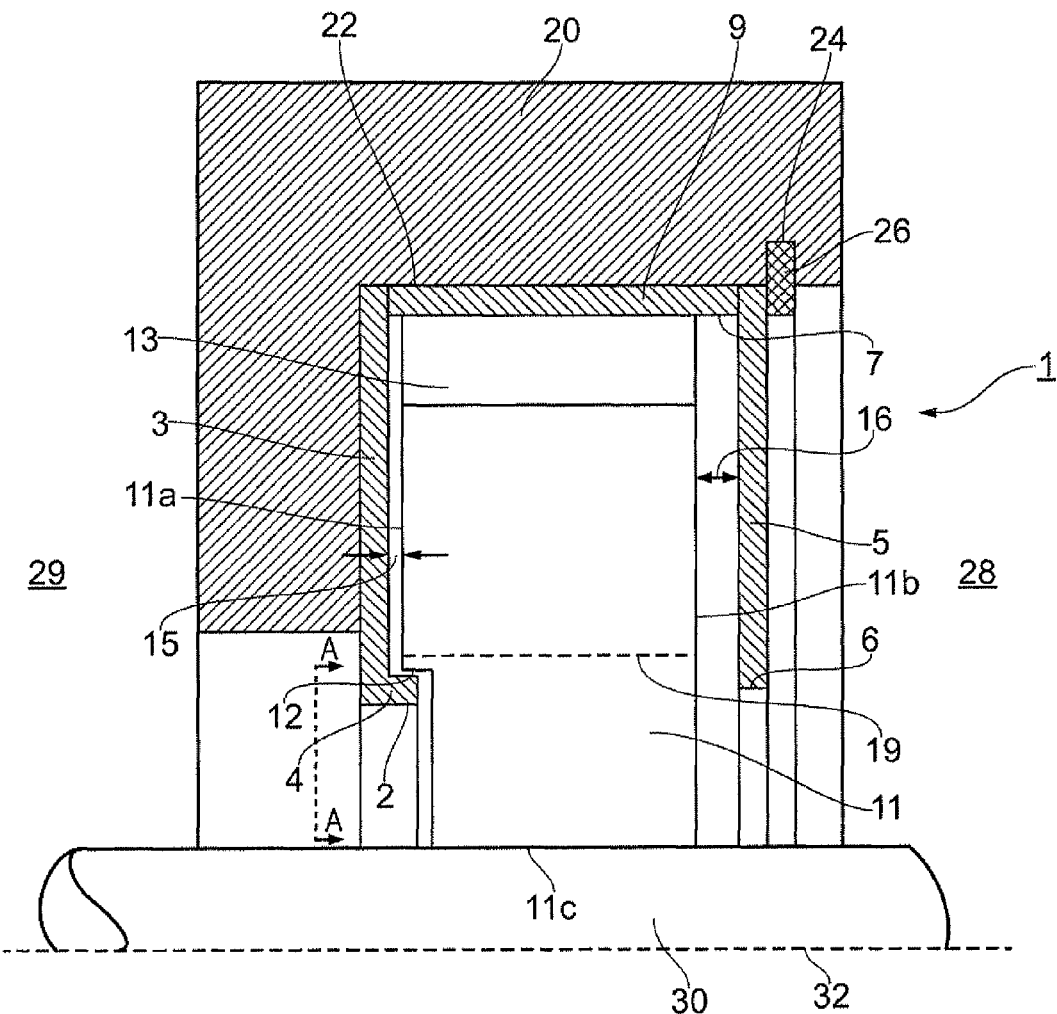
Figure 3:
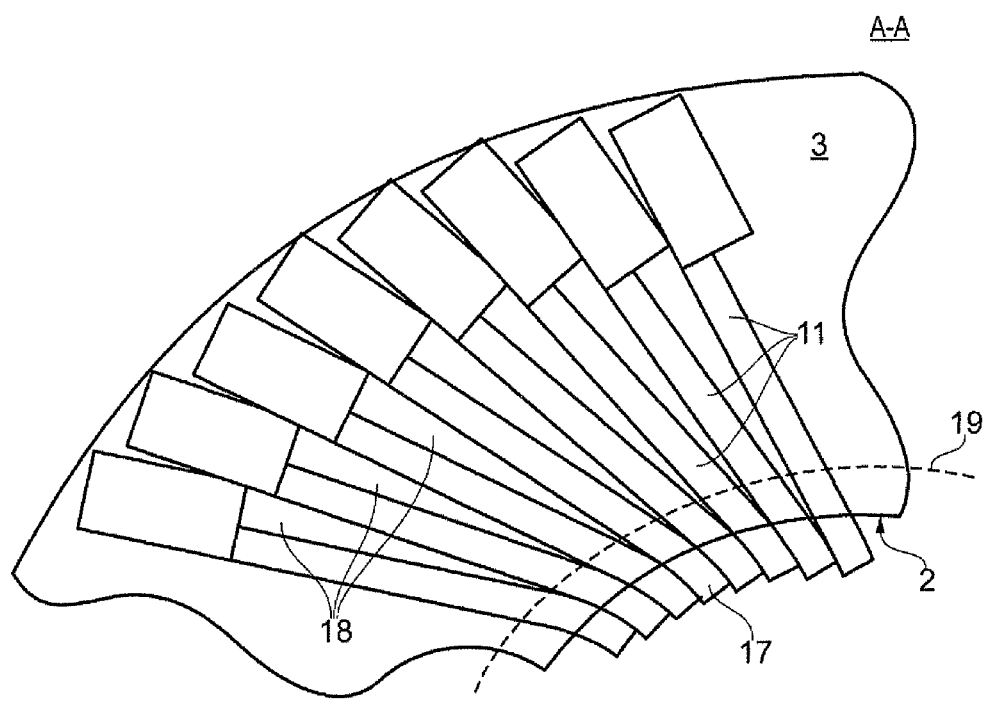
Figure 4:
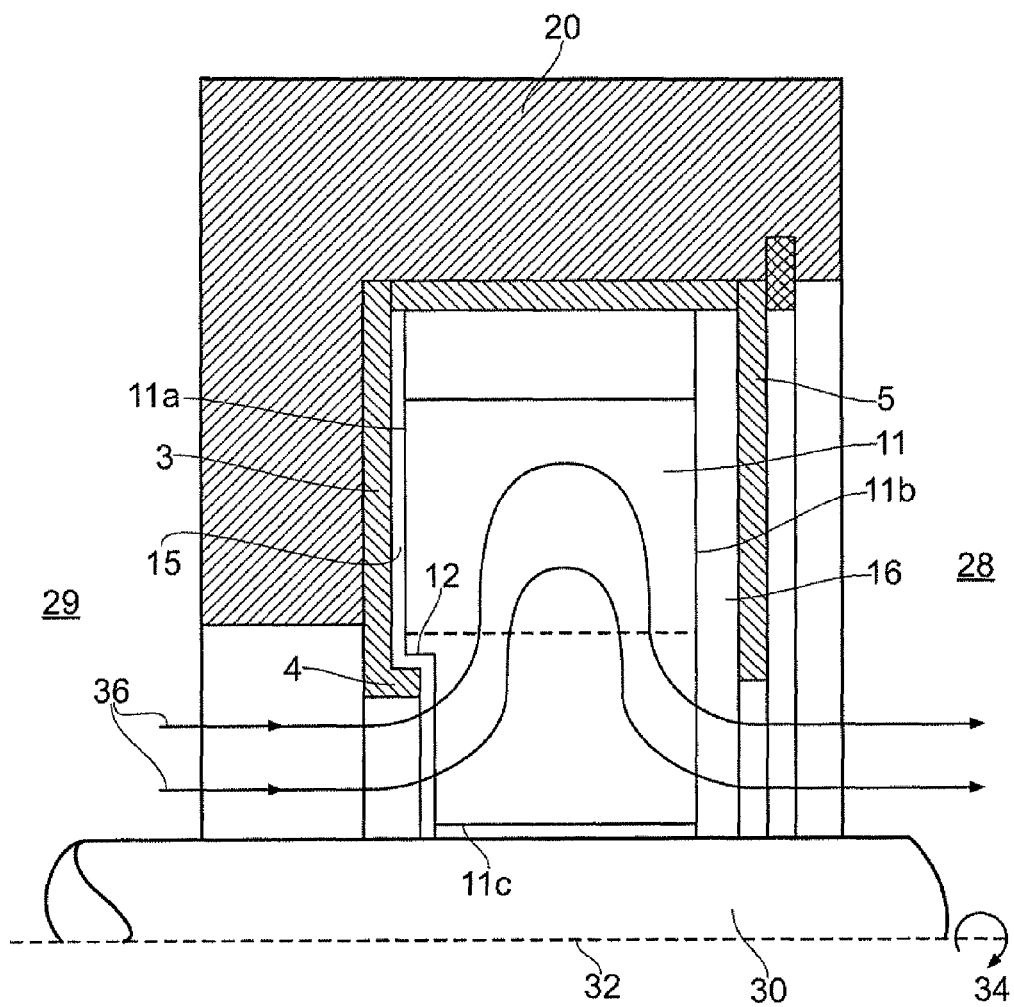
Figure 5:
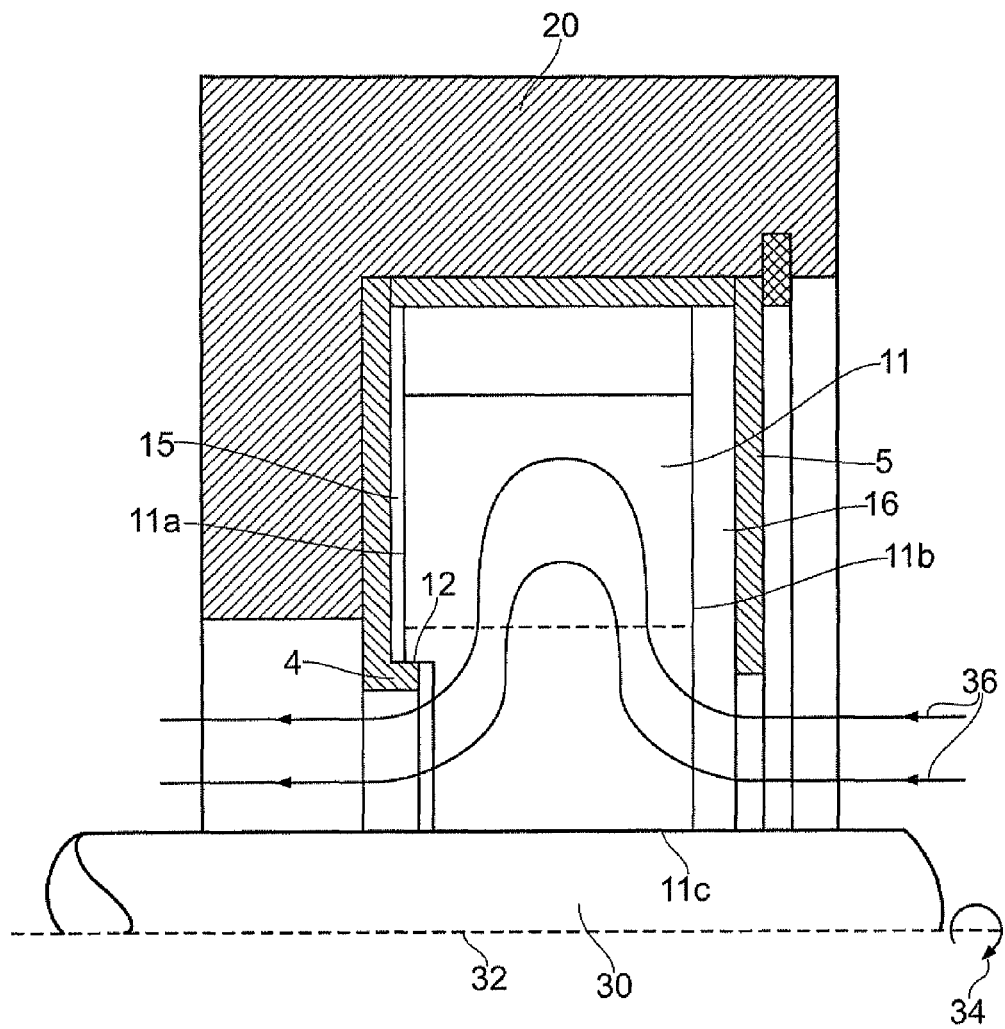
Figure 6:
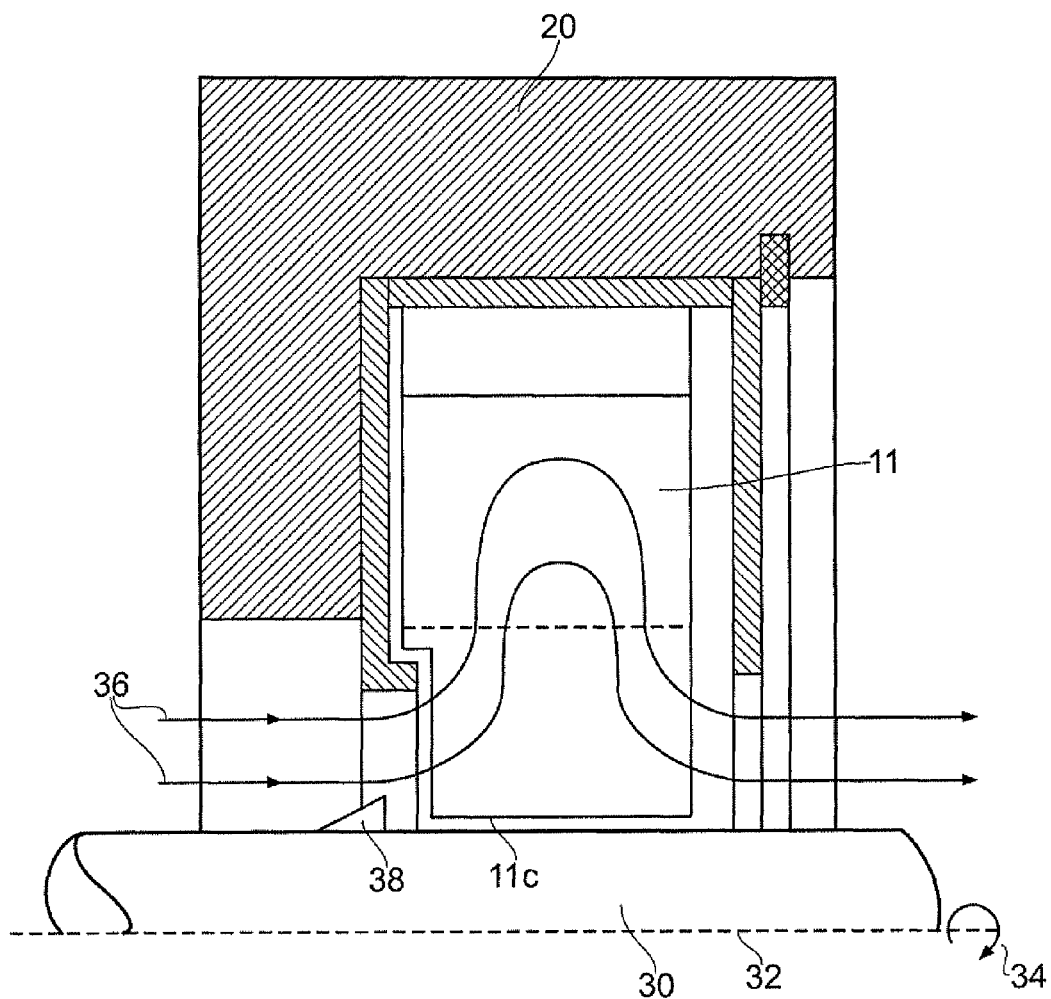

Embodiments of the present invention will now be described, by way of example only, with reference to the accompanying drawings, in which:

FIG. 1 schematically shows a leaf seal assembly according to an embodiment of the present invention;

FIG. 2 schematically shows a cross-sectional view of the leaf seal assembly of FIG. 1 in a resting state;

FIG. 3 schematically shows the view A-A of FIG. 2;

FIG. 4 schematically shows a cross-sectional view of the leaf seal assembly of FIG. 1 in a normal operating condition;

FIG. 5 schematically shows a cross-sectional view of the leaf seal assembly of FIG. 1 during a transient pressure reversal; and FIG. 6 schematically shows a cross-sectional view of a leaf seal assembly according to a second embodiment.

FIG. 1 shows a leaf seal assembly 1. The leaf seal assembly 1 comprises first and second substantially parallel annular cover plates 3, 5 that are spaced apart to define an annular channel 7 (FIG. 2). Within the annular channel 7 is located a plurality of thin resiliently deformable leaf elements 11 that are arranged in an annular pack defining an opening within which a rotatable shaft 30 can be located. Each leaf element 11 comprises a spacer 13 which spaces adjacent leaf elements 11. The plurality of leaf elements 11 are attached, for example by welding, to a cylindrical backing ring 9 which is located between and is attached to the first and second cover plates 3, 5. The first cover plate 3 comprises a circular first inner edge 2 and the second cover plate 5 comprises a circular second inner edge 6 and each of the leaf elements 11 extends beyond the first and second inner edges 2, 6. The opening defined by the annular pack of leaf elements 11 is coaxial with the first and second inner edges 2, 6 of the first and second cover plates 3, 5. The leaf elements 11 extend at an angle to the true radius and can bend, or flex, along their length.

With reference to FIG. 2, a first edge 11a of each leaf element 11 is adjacent to an inner surface of the first cover plate 3 and a second edge 11b, parallel to the first edge 11a,, of each leaf element 11 is adjacent to an inner surface of the second cover plate 5. The inner surface of the first cover plate 3 is spaced from the first edges 11a, of the leaf elements 11 by a first gap 15 and the inner surface of the second cover plate 5 is spaced from the second edges 11b, of the leaf elements 11 by a second gap 16. The second gap 16 is larger than the first gap 15.

The first cover plate 3 further comprises an axially extending shoulder 4 and the first edge 11a, of each leaf element 11 comprises a corresponding step portion 12.

In use, the leaf seal assembly 1 is positioned between a rotating shaft 30 and a housing 20. In this embodiment the rotating shaft 30 is a rotating shaft of a gas turbine engine and the housing 20 is a bearing chamber housing defining a bearing chamber 28; in use the leaf seal assembly 1 will provide a seal to prevent or reduce fluid flow between the bearing chamber 28 and a region 29 outside the bearing chamber. The leaf seal assembly 1 is located within a counterbore 22 of the housing 20 and, in this embodiment, is secured in place using a circlip 26 which is located in a cylindrical groove 24. The rotating shaft 30 is located within the opening defined by the annular pack of leaf elements 11. The rotating shaft 30, annular pack of leaf elements 11, first and second annular cover plates 3, 5 and cylindrical backing ring 9 are all coaxial about an axis 32. It will be appreciated that the exact means for locating and securing the leaf seal assembly is essentially a matter of design choice, and not critical to the operation of the invention.

In a stationary or resting state (shown in FIG. 2), a radially inner (or third) edge 11c of each leaf element 11 rests against, or is in contact with, the outer surface of the rotating shaft 30. This provides a seal between the inside and the outside of the bearing chamber housing 20. The step portion 12 of each leaf element 11 is spaced from the shoulder 4 of the first cover plate 3. The fluidic pressure within the bearing chamber 28 is equal to the pressure outside the chamber (in the region 29) and therefore there is no fluid flow through the leaf seal assembly 1.

Referring now to FIG. 3, in the resting state the plurality of leaf elements 11 converge at a radial position 19 radially outward of the first inner circular edge 2 of the first cover plate 3 (the first cover plate 3 is shown as transparent in FIG. 3 for clarity). This results in a contiguous arrangement 17 of leaf elements 11 between the rotating shaft (30 in FIG. 2) and the edge 2 of the first cover plate 3, which inhibits or eliminates leakage between adjacent leaf elements 11. Radially outward from the position where the leaf elements converge 19 there are gaps 18 between adjacent leaf elements. Therefore, there may (if there is a pressure difference between the bearing chamber 28 and the region 29 of FIG. 2) be leakage flow between adjacent leaves 11 in these radially outward positions, but any such leakage will be minimised by the proximity of the first cover plate 3 to the leaves 11 (as shown by gap 15 in FIG. 2).

Also, in this embodiment the plurality of leaf elements 11 converge at a position radially outward of the shoulder (4 in FIG. 2).

With reference to FIG. 4, in use, and under normal running conditions, the shaft 30 rotates in a clockwise direction 34 and the pressure within the bearing chamber 28 is lower than the pressure outside the chamber (in region 29). This results in a fluid flow 36, such as an airflow, into the bearing chamber 28. The airflow 36 is directed through the gap between the edge of the first cover plate 3 and the rotating shaft 30. The airflow meets the contiguous (i.e. solid) arrangement 17 (FIG. 3) of leaf elements 11 and is directed radially outwards through the gap between the shoulder 4 of the first cover plate 3 and the step portion 12 of the leaf elements 11. The airflow is then directed through the gap 15 between the first edges 11a of the leaf elements 11 and the inner surface of the first cover plate 3 and is directed through the gaps 18 (FIG. 3) between adjacent leaf elements 11. The airflow then passes into the bearing chamber 28 through the gap between the second cover plate 5 and the rotating shaft 30. Because the gap 16 is larger than the gap 15, the above described airflow 36 through the leaf elements 11 causes an aerodynamic lift on the leaf elements 11 that causes them to resiliently flex along their radial length. This causes the inner edges 11c, of the leaf elements 11 to lift up and move away from the outer surface of the rotating shaft 30. This prevents the lower edges 11c, of the leaf elements 11 from wearing and provides an air film in the gap between the lower edges 11c, of the leaf elements 11 and the outer surface of the rotating shaft 30. The flow of air 36 into the bearing chamber 28 prevents any fluid, such as oil, from leaking out of the bearing chamber.

With reference to FIG. 5, in a transient pressure reversal, such as may occur during engine start-up, the pressure within the bearing chamber 28 becomes higher than the pressure outside the chamber. There is therefore a tendency for a fluid flow 36, such as an airflow, from the inside to the outside of the bearing chamber housing 20. The airflow 36 is directed through the gap between the edge of the second cover plate 5 and the outer surface of the rotating shaft 30. The airflow 36 is directed radially outwards through the gap 16 between the second edges 11b, of the leaf elements 11 and the inner surface of the second cover plate 5 and then passes through the gaps 18 (FIG. 3) between adjacent leaf elements 11. Because the gap 15 is smaller than the gap 16, this airflow through the leaf elements 11 causes them to 'blow down' so that the lower edges 11c, of the leaf elements 11 are in contact with the outer surface of the rotating shaft 30 and the step portions 12 of the leaf elements 11 are in contact with the shoulder 4 of the first cover plate 3. The shoulder 4 and the corresponding step portions 12 of the leaf elements prevent the leaf elements 11 from being blown down too hard against the outer surface of the rotating shaft 30. This prevents the lower edges 11c, of the leaf elements 11 from being damaged. Further, the shoulder 4 and the corresponding step portions 12 of the leaf elements 11 form a secondary seal (in addition to the seal formed by the lower edges 11c, of the leaf elements 11 and the outer surface of the rotating shaft 30) and inhibits the flow of fluid that passes through the gaps 18 between adjacent leaf elements 11 exiting the seal assembly 1. This is because the leaf elements 11 converge at a radial position 19 (FIG. 2, FIG. 3) radially outward of the shoulder 4.

The contact between the lower edges 11c, of the leaf elements 11 and the outer surface of the rotating shaft 30, and the contact between the step portions 12 of the leaf elements 11 and the shoulder 4 of the first cover plate 3, in combination with the contiguous arrangement 17 of leaf elements 11 between the rotating shaft 30 and the edge 2 of the first cover plate 3, prevents fluid from flowing from the inside to the outside of the bearing housing chamber 20 during a transient pressure reversal.

The shoulder 4 may be coated with a wear resistant or abradable layer; or it may be made from, or have an insert of, a polymer or PTFE material. The former would avoid damage to the shoulder 4, whilst the latter will improve the effectiveness of the secondary seal in suitably low temperature environments.

The leaf seal assembly 1 is configured such that when there is a fluid flow in one direction, for example into the bearing chamber housing 20, the leaf elements 11 lift up, thereby allowing a fluid flow into the housing. Conversely, when there is a fluid flow in the opposite direction, for example out of the bearing chamber housing 20, the leaf elements 11 blow down, thereby sealing against fluid exiting the housing 20. This effect is achieved by appropriate positioning of the cover plates 3, 5. The gaps 15, 16 between the first and second edges 11a, 11b, of the leaf elements 11 and their respective cover plates can be chosen to produce this effect. The second gap 16 may be larger than the first gap 15. However, the relative sizes of the gaps 15, 16 to produce the desired effect depends on a number of factors including: the dimensions of the leaf elements, the material of the leaf elements, the overall size of the leaf seal, the dimensions of the cover plates, the pressure gradient across the seal, the dimensions of the spacers, and the radial position at which the leaf elements converge. The radial position at which the leaf elements converge is influenced by, among other things, the relationship between the leaf thickness and the gap width dictated by the spacers.

As shown in FIG. 6, in a second embodiment the rotating shaft 30 is provided with a circumferentially extending ramped portion 38 that is located outside the bearing chamber housing 20. This ramped portion 38 discourages the airflow 36 from passing straight through the gap created between the lower edges 11c, of the leaf elements 11 and the rotating shaft 30 when the leaf elements 11 lift up. This feature is most effective in seal applications where the relative axial displacement between the rotating shaft 30 and the seal 1 is small, such as close to bearings, for example.

In a further embodiment of the invention, not shown in the drawings, the shoulder 4 in the first cover plate 3 and the corresponding step portions 12 in the leaf elements 11 are absent. The first and second edges 11a,, 11b, of the leaves are straight along their whole lengths, and parallel to each other. As in the previously-described embodiments, the gap 15 between the first edges 11a of the leaf elements 11 and the first cover plate 3 is smaller than the gap 16 between the second edges 11b and the second cover plate 5, so that the lift-up and blow-down behaviour of the leaf elements is the same as previously described. Although the absence of the shoulder and step portions means that there will be no secondary seal (as described above with reference to FIG. 5) under pressure reversal conditions, it is anticipated that such a leaf seal assembly would still effectively prevent fluid flow from the inside to the outside of the bearing chamber 28. The contiguous arrangement 17 of leaf elements 11 between the rotating shaft 30 and the edge 2 of the first cover plate 3 will prevent fluid flow through that radially inner portion of the leaf elements 11, and the blow-down of the leaf elements against the rotating shaft 30 will prevent fluid flow between the third edges 11c and the rotating shaft 30. Although fluid may flow through the gaps 18 between the leaf elements 11, the presence of the first cover plate, and in particular the smallness of the gap 15, will impede this flow and minimise the fluid leakage under pressure reversal conditions.

In the embodiments described, the invention has been employed to provide a seal against a rotating shaft. However, it could equally well provide a seal where there is no relative rotation but where there is a risk of a pressure reversal in operation (for example in a combustor burner seal for a gas turbine engine).

The invention therefore provides a leaf seal which can provide an effective seal even when the pressure gradient across the seal is reversed, by the combination of the lift-up and blow-down behaviour of the leaf elements and the provision of cover plates. In a preferred embodiment of the invention, the shoulder and step portions provide a secondary seal that further reduces the fluid flow under pressure reversal conditions. A leaf seal according to the invention can therefore be oriented, in use, to take into account the predominant direction of fluid flow through the seal and also to take account of the sealing requirements. In the context of a bearing chamber, air flow into the chamber is generally desirable as it prevents oil from flowing out of the seal, whereas air flow out of the chamber is undesirable under all circumstances as it will carry oil with it. The combination of features of the seal according to the invention provides a unique seal in which the interaction of lift-up and blow-down behaviours permits the desirable inflow of air, while preventing the undesirable outflow of air and oil. In effect, the seal acts as a one-way valve.

In an application in which there is relative rotation between the leaf seal and the component it seals against, a leaf seal according to the invention will, under normal conditions, operate with little or no wear of the leaf element tips or the rotating shaft because the fluid flow will cause the leaf elements to lift up and ride on an air film.

The invention claimed is:

1. A leaf seal assembly for providing a fluidic seal between a first member and a second member, comprising:
   first and second cover plates defining a channel therebetween, wherein the first cover plate comprises a first inner edge and a shoulder that extends into the channel, and wherein the second cover plate comprises a second inner edge;
   a plurality of leaf elements located within the channel, wherein each leaf element comprises: first and second leaf edges adjacent to the first and second cover plates, respectively; and a step portion corresponding to the shoulder of the first cover plate, and wherein a projecting portion of each leaf element extends beyond the first and second inner edges; and
   a first gap between the first leaf edges of the plurality of leaf elements and an inner surface of the first cover plate and a second gap between the second leaf edges of the plurality of leaf elements and an inner surface of the second cover plate,
   wherein the size of the first gap and the size of the second gap are selected such that, when the seal assembly is located between a first member and a second member, the plurality of leaf elements (i) move away from the first member to create a fluid passage between the plurality of leaf elements and the first member when subjected to a fluid flow in a first direction from the first cover plate side of the seal assembly to the second cover plate side of the seal assembly, thereby allowing fluid to flow through the seal in the first direction; and (ii) move towards the first member such that a third leaf edge of the projecting portion of each of the plurality of leaf elements contacts the first member when subjected to a fluid flow in a second direction from the second cover plate side of the seal assembly to the first cover plate side of the assembly, thereby opposing the flow of fluid through the seal in the second direction, and
   wherein when there is fluid flow in the second direction, the step portion of each of the leaf elements contacts the shoulder of the first cover plate.

2. A leaf seal assembly according to claim 1, wherein:
   when there is a fluid flow in the second direction, the movement of the plurality of leaf elements towards the first member causes the leaf elements to converge and thereby to oppose the fluid flow in the second direction; and
   the leaf elements converge at a position radially outward of the inner edge of the first cover plate.

3. A leaf seal assembly according to claim 1, wherein the leaf elements converge at a position radially outward of the shoulder.

4. A leaf seal assembly according to claim 1, wherein the second gap is larger than the first gap.

5. A leaf seal assembly according to claim 1, wherein the shoulder and the step portion are configured to not contact each other when fluid flows in the first direction.

6. A leaf seal assembly according to claim 1, wherein the first member is a rotatable shaft and the plurality of leaf elements are arranged in an annular pack defining an opening within which the rotatable shaft can be received.

7. A leaf seal assembly according to claim 6, wherein one or both of the first and second inner edges of the cover plates are circular and are substantially coaxial with the opening defined by the annular pack of leaf elements.

8. A gas turbine engine comprising a leaf seal assembly according to claim 1.

9. An assembly comprising the leaf seal assembly according to claim 1 located between a bearing chamber housing and a rotatable shaft.

10. A gas turbine engine comprising an assembly according to claim 9.

11. A leaf seal assembly for providing a fluidic seal between a first member and a second member, comprising:
   first and second cover plates defining a channel therebetween, wherein the first cover plate comprises a first inner edge and a shoulder that extends into the channel, and wherein the second cover plate comprises a second inner edge;
   a plurality of leaf elements located within the channel, wherein each leaf element comprises: first and second leaf edges adjacent to the first and second cover plates, respectively; and a step portion corresponding to the shoulder of the first cover plate, and wherein a projecting portion of each leaf element extends beyond the first and second inner edges; and a first gap between the first leaf edges of the plurality of leaf elements and an inner surface of the first cover plate and a second gap between the second leaf edges of the plurality of leaf elements and an inner surface of the second cover plate, wherein the plurality of leaf elements are configured to allow fluid to flow from the first cover plate toward the second cover plate and the plurality of leaf elements are configured to reduce fluid from flowing from the second cover plate toward the first cover plate, and wherein when there is a fluid flow in the leaf seal assembly, the step portion of each of the leaf elements contacts the shoulder of the first cover plate.

* * * * *